United States Patent [19]

Lastinger

[11] 4,233,818
[45] Nov. 18, 1980

[54] HEAT EXCHANGE INTERFACE APPARATUS

[76] Inventor: William R. Lastinger, 1533 Winding Way, Clearwater, Fla. 33516

[21] Appl. No.: 918,595

[22] Filed: Jun. 23, 1978

[51] Int. Cl.³ ............................................. F25B 13/00
[52] U.S. Cl. .................................. 62/224; 62/324 A; 236/92 B
[58] Field of Search ..................... 62/224, 324 A, 511, 62/160; 236/92 B; 62/197, 324 R

[56] References Cited

U.S. PATENT DOCUMENTS

| | | | |
|---|---|---|---|
| 2,032,287 | 2/1936 | Kitzmiller | 62/224 X |
| 2,120,764 | 6/1938 | Newton | 62/224 X |
| 3,119,559 | 1/1964 | Heidorn | 62/224 X |
| 3,205,679 | 9/1965 | Geist et al. | 62/511 X |
| 3,677,028 | 7/1972 | Raymond | 62/511X |
| 4,104,044 | 8/1978 | Lange | 62/324 A |

Primary Examiner—William E. Wayner
Attorney, Agent, or Firm—John J. Byrne

[57] ABSTRACT

A heat exchange interface apparatus for installation between a conventional working fluid unit such as an air conditioner or heat pump and a distribution system such as finned heat exchange tubing installed around the perimeter of a domestic or commercial building. The interface apparatus includes a variable, self adjusting valve which controls and regulates the amount of cooling fluid delivered to the heat exchange tubing in accordance with the temperature of the working fluid at the outlet end of the heat exchange tubing.

6 Claims, 6 Drawing Figures

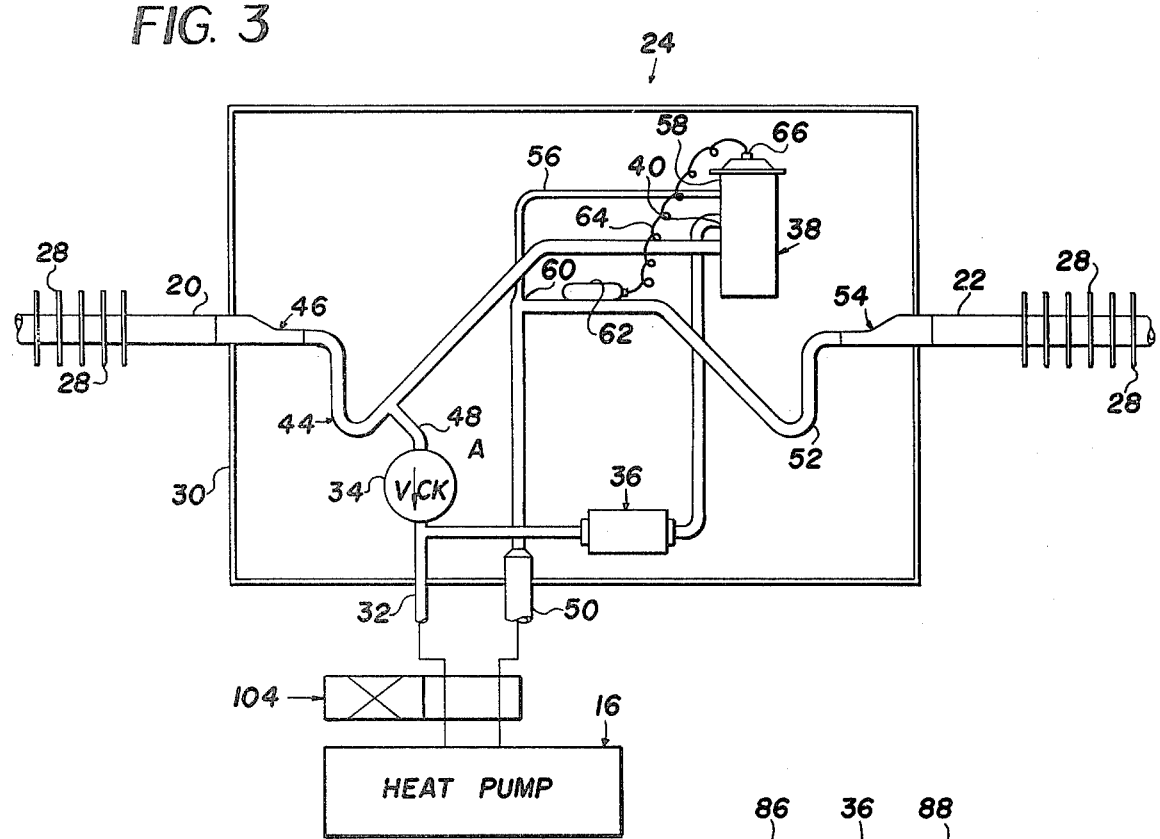
FIG. 3
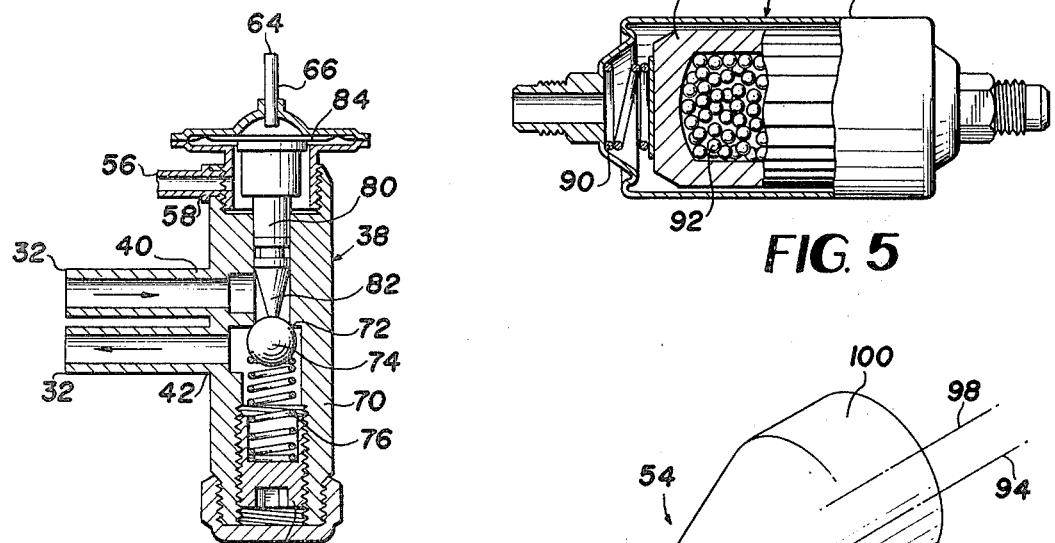
FIG. 4
FIG. 5
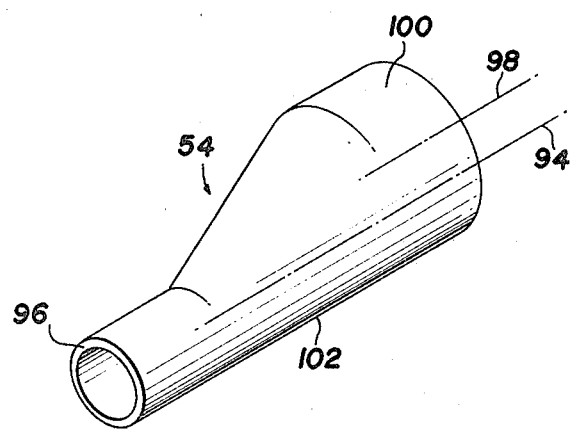
FIG. 6

HEAT EXCHANGE INTERFACE APPARATUS

BACKGROUND OF THE INVENTION

This invention relates to an apparatus for interfacing between a working fluid device and heat exchange tubing. More specifically the invention relates to an apparatus for interfacing between a heat pump or air conditioner and finned tube, perimeter heat exchange conduits in a domestic or commercial building.

In the field of heating, ventilating and air conditioning systems there are basically two concepts of fluid distribution. One technique is to install heating and cooling ducting. An environmental control unit is then normally installed in a central location whereby cooled or heated air is distributed by being blown through the ducting. Another distribution technique entails installation of perimeter finned tubing. A hot or cool working fluid is then pumped through the tubing where conduction and convection serves to liberate or absorb heat respectively from the ambient environment. Although it is recognized that combinations of these and other types of systems exist, for purposes herein, it is believed sufficient to focus our attention to these two basic systems.

Although forced air distribution systems have at least some advantages and have received a degree of commercial utilization, disadvantages also exist. In this regard air ducting can create drafts and unequal distribution patterns within a suite of rooms. Additionally, duct work creates a potential hazard in the event of fire by carrying smoke from one room to another. Further forced air systems tend to be somewhat inefficient. Still further air handling units add a degree of mechanical motion and thus present a potential failure aspect to the overall system operation.

A finned tube perimeter system is initially more expensive to install but is believed to be more efficient and thus more economical over the life of a system. Natural convection tends to provide a more uniform heating and cooling distribution pattern. Additionally finned tube distribution systems do not entail any moving parts and thus are not subject to motion wear and failure. One notable drawback, however, noted with tubing systems is a tendency to emit annoying hissing, knocking or similar noises due to vapor release or the expansion of fluid within the tubular distribution system.

At least one previously known system has attempted to solve the noise problem in a tubular system by using a series of progressively enlarged diameter piping in the distribution system. Although this solution has at least a degree of theoretical appeal such systems tend to be customized and dependent upon utilizing exact lengths of various sized tubing. Initial installation therefore tends to be somewhat complex and expensive. In the event further capacity is required, as by adding a room to the existing structure, it is impossible to merely tap onto the existing tubing because this adds an imbalance to the system. Further, such prior known systems utilize a large number of valves to make the design operational. Valving tends to be more expensive than straight tubing and thus exacerbates the initial installation cost of the system.

The difficulties suggested in the preceding are not intended to be exhaustive, but rather are among many which have tended to reduce the effectiveness and user satisfaction of prior heating, ventilating and air conditioning systems. Other noteworthy problems may also exist; however, those presented above should be sufficient to demonstrate that heating and cooling systems appearing in the past will admit to worthwhile improvement.

OBJECTS OF THE INVENTION

It is therefore a general object of the invention to provide a novel interface apparatus in a heat pump or air conditioning finned tube distribution system which will obviate or minimize problems of the type previously described.

It is a specific object of the invention to provide a novel interface apparatus between heat exchange tubing and a source of working fluid wherein evaporation noise within the heat exchange tubing is minimized.

It is a further object of the invention to provide a novel interface apparatus between heat exchange tubing and a source of working fluid such that the tubing diameter may remain uniform throughout its length without precipitating excessive hissing or evaporation noise.

It is yet a further object of the invention to provide a novel interface apparatus between heat exchange tubing and a source of working fluid wherein the interface is self-adjusting to accommodate for variant load conditions.

It is another object of the invention to provide a novel interface apparatus between heat exchange tubing and a source of working fluid which will protect a compressor within the source of working fluid from contamination.

It is still another object of the invention to provide a novel interface apparatus between heat exchange tubing and a source of working fluid wherein additions to the heat exchange tubing may be facilely accommodated.

It is yet still another object of the invention to provide a novel interface apparatus between heat exchange tubing and a source of working fluid which is economical in installation and operation and may be installed as a new unit or added to an existing system to enhance its operating performance.

BRIEF SUMMARY

A preferred embodiment of the invention which is intended to accomplish at least some of the foregoing objects comprises a first conduit means connected at one end to a source of cooling fluid and at the other end to one end of a heat exchange tubing. A second conduit means is connected at one end to a return to the source of cooling liquid and at the other end to the other end of the heat exchange tubing. A variable control valve is interposed between the ends of the first conduit means and serves to meter fluid flowing from the source of cooling fluid into the tubular heat exchange means in accordance with the cooling load upon the heat exchange means.

THE DRAWING

Other objects and advantages of the present invention will become apparent from the following detailed description taken in conjunction with the accompanying drawings wherein:

FIG. 3 is a detail view of the subject interface piping system in accordance with a preferred embodiment of the invention, including a variable control valve;

FIG. 4 is a cross-sectional detail view of the variable control valve disclosed in FIG. 3;

FIG. 5 is a detail view of a filter and drying unit which is partially broken away to disclose internal detail; and FIG. 6 is a detail axonometric view of an eccentric coupling as used at each end of the heat exchange tubing.

DETAILED DESCRIPTION

Figure 1:
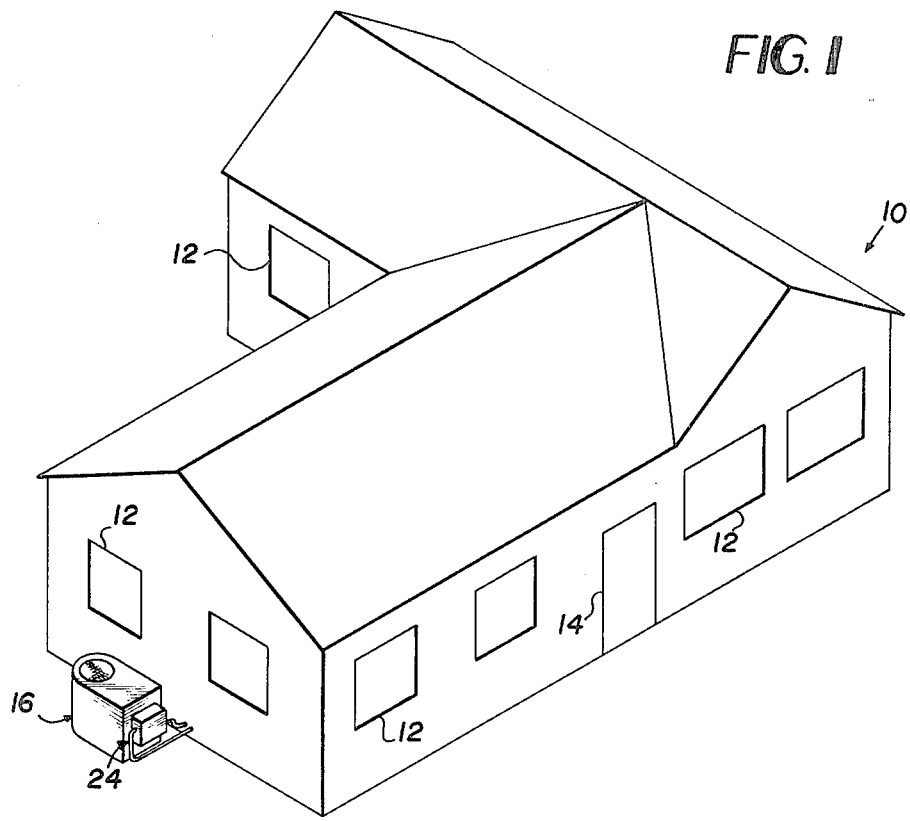
FIG. 1 is an axonometric view of a typical domestic building with an attached heat pump or air conditioning unit and an interface apparatus in accordance with the invention.
Figure 2:
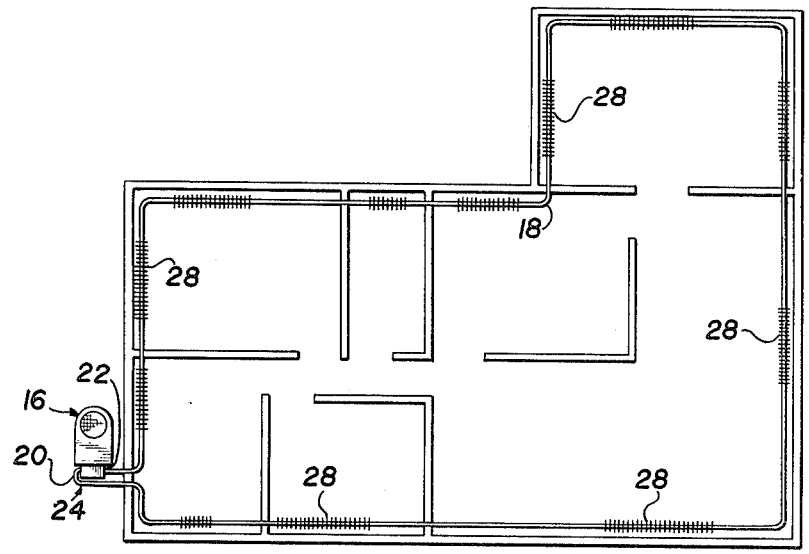
FIG. 2 is a plan view of the domestic building depicted in FIG. 1 and discloses a heat pump, an interface apparatus and a finned tube perimeter heat exchanger for delivering working fluid to the interior of the building or home.

Turning now to the drawings and particularly FIG. 1 thereof there will be seen an axonometric or pictorial view of a typical domestic building such as a detached single story house 10 having windows 12, doors 14, etc., in a conventional manner. Temperature within the home may be controlled by a working fluid device such as an air conditioner unit (not shown) or a heat pump 16 installed adjacent the building structure. Working fluid is pumped into the house, via a continuous loop of perimeter heat exchange tubing 18, note FIG. 2, having one end 20 and another end 22.

An interface apparatus 24, forming the subject matter of the instant invention, is interposed between the conventional heat pump 16 (or air conditioning unit not shown) and the heat exchange tubing.

The heat exchange tubing 18 per se is entirely conventional and is fabricated from a material of high conductivity such as copper. In operation heat transfers from a working fluid circulated within the tubing. This heat transfer is enhanced by attaching a plurality of mutually parallel fins or vanes 28 to the tubing at desired locations or throughout the extent of the tubing as desired.

Turning now to FIG. 3 there will be seen a detail view of the interface apparatus 24 in accordance with the invention.

The interface apparatus 24 is enclosed within a housing 30. A first conduit 32 connects at one end into a fluid line in the outlet side of an air conditioner compressor or heat pump compressor in a cooling mode downstream of an expansion device within the working fluid unit 16. The first conduit 32 enters the interface housing 30 and initially meets the closed side of a one-way check valve 34. The first conduit 32 then passes thru a directional filter and drying unit 36 and into a variable flow control valve 38 at point 40. The first conduit exits from the valve 38 as at 42 and forms a generally "V" or "U" shaped liquid trap 44 before connecting through an eccentric coupling 46 to one end 20 of the heat transfer tubing 18.

As previously mentioned, the interface housing 30 further includes a check valve 34 which interconnects between two branches of a first conduit 32 via conduit 48 and serves to permit fluid within the first conduit to bypass the filter and dryer unit 36 and the variable control valve 38 in the direction of flow arrow A.

A second conduit 50 connects at one end into a fluid line in the inlet side of an air conditioner compressor or heat pump compressor in a cooling mode. The second conduit 50 enters the interface apparatus housing 30 and forms another "V" or "U" shaped liquid trap 52 within the housing before connecting to another eccentric coupling 54. The coupling 54 is mated through the wall of the housing 30 to the other end 22 of the heat transfer tubing 18.

A third conduit 56 extends within the housing and connects at one end 58 to the variable control valve 38 and at the other end 60 into the second conduit 50.

A thermal bulb 62 is clamped by conventional fasteners to the second conduit 50. An outlet in the bulb 62 is connected via a tube 64 into the upper end of the variable valve 38 as at 66 as will be discussed hereinbelow.

Turning now to FIGS. 4–6 there will be seen detail views of various elements of the interface apparatus. More specifically, FIG. 4 discloses the internal detail of the cylindrical valve 38. The valve 38 includes a cylindrical valve housing 70 forming an internal aperature or valve seat 72. A ball valve member 74 is biased against the valve seat by an adjustable compression spring 76. Adjustment of tension within the compression spring 76 is achieved by rotation of base plug 78.

Fluid flow through conduit 32 and past valve seat 72 and ball valve 74 is facilitated in the unit 38 by the provision of a diaphragm-actuated plunger 80. The plunger 80 includes a conical tip on one end 82 thereof which bears against ball 74. The other end of the plunger 80 is butted against a flexible diaphram 84. Downward actuation of the diaphragm 84, and thus plunger 80, is achieved by fluid pressure from the previously mentioned thermal bulb 62 attached to the second conduit 50. Accordingly as the temperature of fluid within the bulb 62 raises, fluid within bulb 62 expands and presses diaphragm 84 downwardly. Downward motion of diaphragm 84 and plunger 80 serves to further open or increase the annular zone between seat 72 and ball valve 74.

Opening pressure of the bulb 62 is advantageously offset or balanced to an extent by internal pressure within the second conduit 56 which is delivered to the back side of the diaphragm 84 at 58.

The filter and dryer unit 36, note FIG. 5, includes a cup shaped ceramic filter 86 enhoused within a cylindrical casing 88. The filter 86 is biased toward the down stream end of the unit by a compression spring 90. Internally, the filter cup 86 is filled with hydroscopic spheres of a conventional composition suitable to withdraw moisture entrained within the system working fluid. The filter and dryer serve in combination to protect the variable valve 38 from contamination which might tend to clog and reduce the operative effectiveness thereof over a period of extended operation.

Turning now to FIG. 6, there will be seen an eccentric expansion/reduction (depending upon the direction of fluid flow) coupling. The central longitudinal axis 94 of the relatively small diameter end 96 is offset from the central longitudinal axis 98 of the relatively enlarged diameter end 100 to an extent that the lower most surface 102 of the coupling member 54 is continuous. This eccentric reduction stage permits free passage of lubricating fluid entrained within the working fluid and prevents collection and buildup of such fluid within the exchanger tubing.

Having described the elements of a preferred embodiment of the subject invention; in operation, when an air conditioner is utilized as the working fluid device or when a heat pump set in a cooling mode is utilized as the working fluid device, working fluid such as Freon is compressed and pumped through a condenser to remove heat. The condensed fluid is then forced through an expansion device such a capillary tube or an expansion valve and into the first conduit 32 of the subject interface apparatus.

The working fluid initially meets the back side of check valve 34 within the interface apparatus and is therefore directed away through the filter and dryer unit 36 and into the variable control valve 38 at point 40. The fluid then passed valve seat 72 and ball 74, through trap 44 and into the one end 20 of the heat exchange tubing. The cooling fluid then circulates through the perimeter heat exchange tubing and absorbs heat from the environment and returns to the interface apparatus at the other end 22 of the tubing. The warmed or spent cooling fluid then passes through reduction coupling 54, trap 52 and back to the compressor of the working fluid unit via the second conduit 50.

In the event more heat than the design norm is absorbed by the working fluid from the eivironment, fluid within the bulb 62 will expand driving the diaphragm 84 downwardly and thus pushing the ball 74 further away from the valve seat 72. The enlarged annular orifice within the valve unit 38 permits a greater volume of cooling fluid to enter the heat exchange tubing. This regulated delivery of cooling fluid accommodates varying load requirements and permits the use of constant diameter tubing and also the addition of tubing sections without concomitantly producing objectionable noise within the system.

In the event the subject interface is utilized with an air conditioning unit or a heat pump in the cooling mode only the foregoing is a complete description of the operative cycle. In those instances, however, where the working fluid device is a heat pump and it is desired to shift the system over to a heating mode, a four-way valve 104 may be utilized to direct fluid directly from the heat pump compressor and into the second conduit 50. The heated working fluid then passes through trap 52 and into the other end 22 of the heat exchange tubing 18. The heated fluid circulates through the fin tube perimeter system and liberates heat into the enclosed environmental and thus is itself cooled. The cooled or spent working fluid returns to the interface apparatus 24 at the tubing end 20 and passes through the reduction section 46 and the trap 44. The spent fluid will travel to the valve 38 but will be blocked by the closed ball valve 84 against seat 72. The closed posture of the ball is assured by channeling compressed fluid from conduit 50 to the diaphragm through conduit 56. The withdrawn plunger thus permits fluid within conduit 32 and the spring force 76 to maintain the ball valve 74 in a closed posture. Accordingly the spent fluid will be diverted around valve 38 through check valve 34 in the direction of arrow A back to the heat pump for delivery into an expansion valve and evaporator as is well known in the art.

In describing an interface apparatus in accordance with a preferred embodiment of the invention, those skilled in the art will recognize several advantages which singularly distinguish the subject invention from previously known systems.

A particular advantage that the subject interface apparatus enables installation of a desired finned tube distribution system while eliminating a need for costly graduated runs of fined tubing in order to minimize heat exchanger noise.

Additionally the subject interface apparatus enables a user to add additional tubing segments to the heat exchange tubing without disturbing the system balance. In the same vein the subject interface system may be facilely adopted to existing units to provide enhanced operating characteristics over a range of load requirements.

The provision of the filter-dryer unit along with the eccentric couplings and liquid traps provides protection for the variable valve 38 as well as elements of the working fluid unit such as the compressor.

The variable, self controlled valve unit 38 advantageously permits the unit to accommodate varying loads and working fluid flows while minimizing the tendency of the heat exchange system to hiss or produce objectional expansion noise.

Moreover while the subject interface will work well with air conditioning units it will also function and accommodate both heating and cooling modes of a heat pump.

In describing the invention, reference has been made to a preferred embodiment. Those skilled in the art, however, and familiar with the disclosure of the subject invention, may recognize additions, deletions, modifications, substitutions, and/or other changes which will fall within the purview of the subject invention.

What is claimed is:

1. An apparatus for interfacing between heat exchange tubing, of the type designed to be installed along the perimeter of a generally enclosed space to modify temperature within the enclosed environment, and a working fluid device, including a compressor having an outlet or pressure side and an inlet or vacuum side and a fluid expansion member, for supplying a temperature modifying fluid to the heat exchange tubing for distribution along the perimeter of the generally enclosed space, said interfacing apparatus comprising:

first conduit means for connection at one end into a fluid path in the outlet side of the compressor, in a cooling mode of operation of the working fluid device, and for connection at the other end thereof into one end of the heat exchange tubing installed about the perimeter of the generally enclosed space;

second conduit means for connection at one end into a fluid path in the inlet side of the compressor, in a cooling mode of operation of the working fluid device, and for connection at the other end thereof into the other end of the heat exchange tubing installed about the perimeter of the generally enclosed space;

valve means interposed between said one end and said other end of said first conduit means for regulating the amount of working fluid, cooled by the fluid expansion member within the working fluid device, that passes from said first end to said second end of said first conduit means, said valve means comprising, a variable, self-adjusting valve means for controlling the amount of cooling fluid flowing through the apparatus for interfacing;

temperature sensing means mounted upon said second conduit means and being operably connected to said valve means for adjusting said valve means in accordance with the temperature of the cooling fluid within said second conduit means;

third tubing means connected at one end into said second tubing means and at the other end into said variable, self-adjusting valve means for at least partially offsetting internal pressure with said valve means to facilitate opening said valve means;

liquid trap means formed intermediate the ends of each of said first conduit means and said second conduit means to isolate the inlet side of the compressor from liquid; and eccentric coupling means connected between each of said first and second conduit means and a respective end of said heat exchange tubing for permitting liquid within the heat exchange tubing to pass into said trap means.

2. An apparatus for interfacing between heat exchanger tubing and a working fluid device as defined in claim 1 wherein:
said working fluid device comprises a heat pump unit.

3. An apparatus for interfacing between heat exchanger tubing and a working fluid device as defined in claim 1 wherein:
said working fluid device comprises an air conditioner unit.

4. An apparatus for interfacing between heat exchange tubing of the type designed to be installed along the perimeter of a generally enclosed space to modify temperature within the enclosed space and a heat pump unit having a cooling mode and a heating mode, said heat pump unit including at least a compressor and a fluid expansion member, said heat pump unit being operable for supplying working fluid to the heat exchange tubing for distribution along the perimeter of the generally enclosed space, said interfacing apparatus comprising;

first conduit means for connection at one end of said heat pump unit and for connection at the other end to one end of the heat exchange tubing extending about the perimeter of the generally enclosed space for receiving working fluid from said heat pump unit in a cooling mode and returning working fluid to said heat pump unit in a heating mode;

second conduit means for connections at one end to said heat pump unit at the other end to the other end of said heat exchange tubing extending about the perimeter of the generally enclosed space for receiving working fluid from said heat pump unit in a heating mode and for returning working fluid to said heat pump unit in a cooling mode;

variable valve means interposed between said one end and said other end of said first conduit means for regulating the amount of cooling fluid delivered into said heat exchange tubing during a cooling mode of said heat pump unit, said variable valve means comprising, a variable, self-adjusting valve for controlling the amount of cooling fluid flowing through the apparatus for interfacing;

temperature sensing means mounted upon said second conduit means and operably connected to said variable valve means for adjusting said variable valve means in accordance with the temperature of the cooling fluid within said second conduit means;

check valve means bypassing said variable valve for blocking the flow of cooling fluid around said variable valve when said heat pump unit is in a cooling mode and for permitting the flow of fluid around said variable valve when said heat pump unit is in a heating mode;

third tubing means connected at one end into said second tubing means and at the other end into said variable, self-adjusting valve for at least partially offsetting internal pressure with said valve means to facilitate opening of said valve means; and eccentric coupling means connected between each of said first and second conduit means and a respective end of said heat exchange tubing for permitting liquid within the heat exchange tubing to pass into said conduit means.

5. An apparatus for interfacing between heat exchange tubing and a heat pump unit as defined in claim 4 and further comprising:
filter and dryer means, interposed within said first conduit means upstream of said variable valve for protecting said valve from contamination.

6. An apparatus for interfacing between heat exchanger tubing and a heat pump unit as defined in claim 4 and further comprising:
liquid trap means formed intermediate the ends of each said first conduit means and said second conduit means to isolate the inlet side of the compressor from liquid.

* * * * *